United States Patent
Hong

(10) Patent No.: US 9,511,794 B2
(45) Date of Patent: Dec. 6, 2016

(54) ELECTRIC POWER STEERING SYSTEM AND METHOD FOR PROCESSING FAIL-SAFE OF ELECTRONIC CONTROL UNIT

(71) Applicant: MANDO CORPORATION, Pyeongtaek-si, Gyeonggi-do (KR)

(72) Inventor: Seung Gyu Hong, Bucheon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/750,906

(22) Filed: Jun. 25, 2015

(65) Prior Publication Data
US 2015/0375776 A1  Dec. 31, 2015

(30) Foreign Application Priority Data
Jun. 25, 2014 (KR) ......... 10-2014-0077888

(51) Int. Cl.
*B62D 1/00* (2006.01)
*B62D 5/00* (2006.01)
*B62D 5/04* (2006.01)

(52) U.S. Cl.
CPC ......... *B62D 5/0463* (2013.01); *B62D 5/049* (2013.01); *B62D 5/0484* (2013.01)

(58) Field of Classification Search
CPC combination set(s) only.
See application file for complete search history.

(56) References Cited

U.S. PATENT DOCUMENTS

| | | | |
|---|---|---|---|
| 2009/0026004 A1* | 1/2009 | Hidaka | B62D 5/049 180/446 |
| 2012/0046832 A1* | 2/2012 | Kariatsumari | B62D 5/0463 701/41 |
| 2013/0261894 A1* | 10/2013 | Kojima | B62D 5/0463 701/41 |

* cited by examiner

*Primary Examiner* — Yonel Beaulieu
(74) *Attorney, Agent, or Firm* — McDermott Will & Emery LLP

(57) ABSTRACT

An electric power steering system including: a torque sensor; a steering angle sensor configured to detect a steering angle value of a steering wheel; a motor position sensor configured to detect a motor rotation angle value which is a rotated angle of a driving shaft of an electric motor; and an electronic control unit configured, when the torque sensor is normal, to generate a first steering assist current for controlling a driving force of the electric motor using the steering torque value, and when the torque sensor fails, to estimate a target motor angular velocity of the electric motor using the steering angle value and the motor rotation angle value and to generate a second steering assist current so as to cause a current motor angular velocity of the electric motor to converge to the target motor angular velocity.

11 Claims, 4 Drawing Sheets

- TARGET MOTOR ROTATION ANGLE
- MOTOR ROTATION ANGLE
- - · - TARGET MOTOR ANGULAR VELOCITY
- - - - - MOTOR ANGULAR VELOCITY

ELECTRIC POWER STEERING SYSTEM AND METHOD FOR PROCESSING FAIL-SAFE OF ELECTRONIC CONTROL UNIT

CROSS-REFERENCE TO RELATED APPLICATION

This application claims priority from and the benefit under 35 U.S.C. §119(a) of Korean Patent Application No. 10-2014-0077888, filed on Jun. 25, 2014, which is hereby incorporated by reference for all purposes as if fully set forth herein.

BACKGROUND OF THE INVENTION

1. Field of the Invention

The present invention relates to an electric power steering system and a method of processing a fail-safe of an electronic control unit.

2. Description of the Prior Art

With the rapid advancement of automotive technology, technical development for various apparatuses for convenience is consistently made for the convenience of drivers.

Among them, an electric power steering system provides a steering assist force by driving an electric motor when a driver operates a steering wheel of a vehicle so as to reduce the driver's steering burden.

In order to control the electric motor, the Electronic Control Unit (ECU) of the electric power steering system should receive a steering torque signal—a signal generated by measuring the steering torque generated by the user to operate the steering wheel—from a torque sensor.

The torque sensor refers to a device configured to convert the steering torque of the steering wheel generated by the driver's steering intention into an electric signal. The torque sensor is installed to the electric power steering system so as to measure the torque of the steering wheel.

In the existing electric power steering system, one fail-safe method for a failure of the torque sensor is to stop the operation of the electric power steering system when the failure of the torque sensor occurs, and then switch the steering system into a manual mode, for example.

However, when the electric power steering system is switched to the manual mode due to the failure of the torque sensor, the steering assist force is momentarily lost, which causes deterioration in stability in the driver's steering.

In particular, in the case of low speed traveling, there is a problem in that the steering force to be burden to the driver sharply increases as the steering assist force is lost.

SUMMARY OF THE INVENTION

In this background, an object of the present invention is to provide an electric power steering system and method, in which, when the torque sensor fails, a target angular velocity of the electric motor is estimated using steering angle information and motor rotation angle information, and a steering assist force is generated by a motor driving current so as to cause a current motor angular velocity to converge to the estimated target angular velocity.

In order to achieve the object described above, in an aspect, the present invention provides an electric power steering system. The system includes: a torque sensor configured to detect a steering torque value of a steering wheel; a steering angle sensor configured to detect a steering angle value of the steering wheel; a motor position sensor configured to detect a motor rotation angle value which is a rotated angle of a driving shaft of an electric motor; and an electronic control unit configured, when the torque sensor is normal, to generate a first steering assist current for controlling a driving force of the electric motor using the steering torque value, and when the torque sensor fails, to estimate a target motor angular velocity of the electric motor using the steering angle value and the motor rotation angle value and to generate a second steering assist current so as to cause a current motor angular velocity of the electric motor to converge to the target motor angular velocity.

In another aspect, the present invention provides a method for processing a fail-safe of an electronic control unit in an electric power steering system. The method includes a basic control performing step of generating a first steering assist current using a steering torque value detected by a torque sensor; a sensor failure detecting step of detecting a failure of the torque sensor while the basic control is performed; a target motor angular velocity estimating step of estimating a target motor angular velocity of the electric motor using a steering angle value of a steering wheel and a motor rotation angle value of an electric motor; and a fail-safe control step of calculating a current motor angular velocity of the electric motor, and generating a second steering assist current so as to cause the current motor angular velocity to converge to the target motor angular velocity.

As described above, according to the present invention, when the torque sensor fails, the electric power steering system is not switched to the manual mode unlike the prior art, and the steering assist force is provided through the control of the motor angular velocity of the electric motor. Therefore, it is possible to prevent the steering assist force from being lost momentarily when the torque sensor fails.

In addition, in the present invention, when the torque sensor fails, a fail-safe is processed through the control of the motor angular velocity of the electric motor, i.e. using a motor angular velocity which is a differential value of the motor rotation angle. Therefore, the motor rotation angle can be controlled such that no overshoot occurs for the target motor rotation angle, which can prevent occurrence of self-steering which is caused by the overshoot of the motor rotation angle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, several embodiments of the present invention will be described in detail with reference to illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
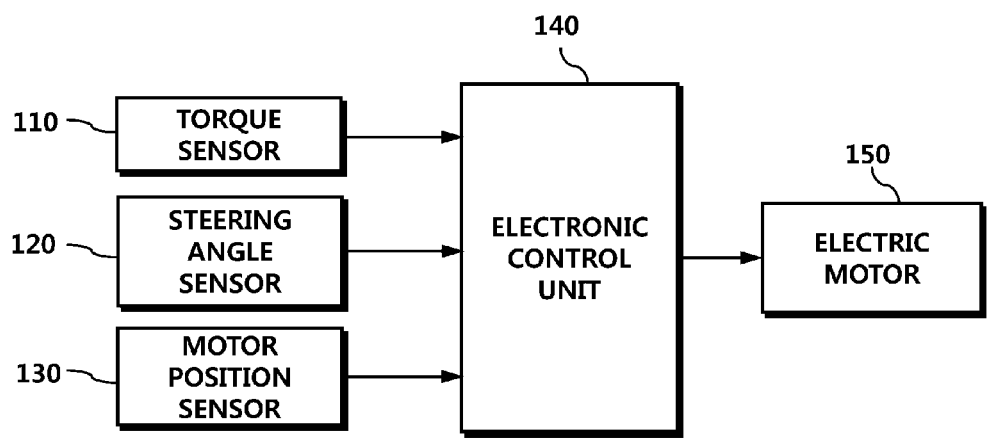
FIG. 1 is a block diagram briefly illustrating a configuration of an electric power steering system according to an embodiment of the present invention.

FIG. 1 is a block diagram briefly illustrating a configuration of an electric power steering system according to an embodiment of the present invention.

According to an embodiment of the present invention, an electric power steering system 100 includes a torque sensor 110, a steering angle sensor 120, a motor position sensor 130, an electronic control unit 140, and an electric motor 150.

The torque sensor 110 detects a steering torque value of a steering wheel. In other words, the torque sensor 110 senses a steering torque through the relative rotational displacement of the input shaft and the output shaft of a steering column (not illustrated) according to the rotation of the steering wheel, generates a steering torque signal which is an electric signal, and transmits the generated steering torque signal to the electronic control unit 140 to be described later.

The steering angle sensor 120 is arranged on the input shaft of the steering column (not illustrated) so as to detect a steering angle value that is a rotation angle of the steering wheel rotated by the driver's operation, and transmit the detected steering angle value to the electronic control unit 140 to be described later.

The motor position sensor 130 detects the rotation position of the electric motor 150, i.e. the motor rotation angle value which is the rotated angle of the motor shaft of the electric motor 150, and transmits the detected motor rotation angle value to the electronic control unit 140 to be described later.

The electronic control unit 140 receives information required for a steering control from a plurality of sensors including the torque sensor 110 and the steering angle sensor 120, and generates a steering assist current considering the received information, thereby controlling the driving force of the electric motor 150.

In an embodiment of the present invention, when the torque sensor 110 is normal, the electronic control unit 140 generates a first steering assist current using the steering torque value detected by the torque sensor 110 so as to control the driving force of the electric motor 150.

Meanwhile, when the torque sensor 110 fails, the electronic control unit 140 estimates the target motor angular velocity of the electric motor 150 using the steering angle value received from the steering angle sensor 120 and the motor rotation angle value received from the motor position sensor 130, and generates a second steering assist current so as to cause the current motor angular velocity of the electric motor 150 to converge to the target motor angular velocity. As one example, when the torque sensor 110 fails in a state where the ignition switch of the vehicle is turned ON, the electronic control unit 140 may generate the second steering assist current. As another example, the electronic control unit 140 may generate the second steering assist current when the torque sensor 110 fails regardless of the state of the ignition switch of the vehicle.

More specifically, as in Equation 1 below, the electronic control unit 140 calculates an estimated steering angle value by multiplying a deceleration ratio of a reducer mechanically connected to the motor shaft of the electric motor 150 by a motor rotation angle value, then calculates an angular deviation by subtracting the estimated steering angle value from a steering angle value received from the steering angle sensor 120, and extracts a target motor angular velocity corresponding to the angular deviation from a previously stored target motor angular velocity table so as to estimate the motor angular velocity.

Steering Angle Value−(Motor Rotation Angle Value*Deceleration Ratio of Reducer)  Equation 1

Here, the electronic control unit 140 may estimate the target motor angular velocity of the electric motor 150 using the steering angle value and the motor rotation angle value detected by the steering angle sensor 120 and the motor position sensor 130 at pre-set sampling intervals.

For example, the steering angle sensor 120 may detect the steering angle value at a first pre-set sampling interval, and the motor position sensor 130 may detect the motor rotation angle value at a second pre-set sampling interval. The first sampling interval and the second interval may be set to be the same or different from each other. When the first sampling interval and the second sampling interval are set to be the same, the steering angle value and the motor rotation angle value used when estimating the target motor angular velocity are the steering angle value and the motor rotation angle value which are detected by the steering angle sensor 120 and the motor position sensor 130 at the same time.

In addition, the electronic control unit 140 may calculate the angular deviation using a steering angle value detected at a time point closest to the time point when calculating the angular deviation among one or more steering angle values detected at the first sampling interval and a motor rotation angle value detected at a time point closest to the time point when calculating the angular deviation among one or more motor rotation angle values detected at the second sampling interval.

For example, descriptions will be made assuming that the first sampling angle is set to 10 ms and the second sampling interval is set to 1 ms. In this case, the steering angle sensor 120 detects the steering angle value at the interval of 10 ms. That is, the steering angle sensor 120 detects a first steering angle value at 0 ms, detects a steering angle value at 10 ms, and detects one or more steering angle values at 10 ms interval in the same manner. Similarly, the motor position sensor 130 detects one or more motor rotation angle values at the interval of 1 ms from 0 ms.

Accordingly, in the case where the time point when calculating the angular deviation is 8 ms, the electronic control unit 140 may calculate the angular deviation using the first steering angle value detected at a time point closest to the corresponding time point and the motor rotation angle value at 8 ms. Similarly, in the case where the time point when calculating the above-described angular deviation is 12 ms, the electronic control unit 140 may calculate the angular deviation using the second steering angle value detected at a time point closest to the corresponding time point and the motor rotation angle value detected at 12 ms.

Meanwhile, in an embodiment of the present invention, the target motor angular velocity table includes one or more target motor angular velocities that correspond to one or more angular deviations, respectively. The target motor angular velocity table may be prepared through a plurality of real vehicle tests.

In an embodiment of the present invention, when the torque sensor 110 fails, the electronic control unit 140 may generate the second steering assist current so as to cause the current motor angular velocity of the electric motor 150 to converge to the target motor angular velocity estimated using the steering angle value and the motor rotation angle value as described above, and may control the occurrence of a failure alarm signal for the failure of the torque sensor 110. For example, the electronic control unit 140 may transmit a failure alarm signal for the failure of the torque sensor 110 to the dash board of the vehicle.

Figure 2:
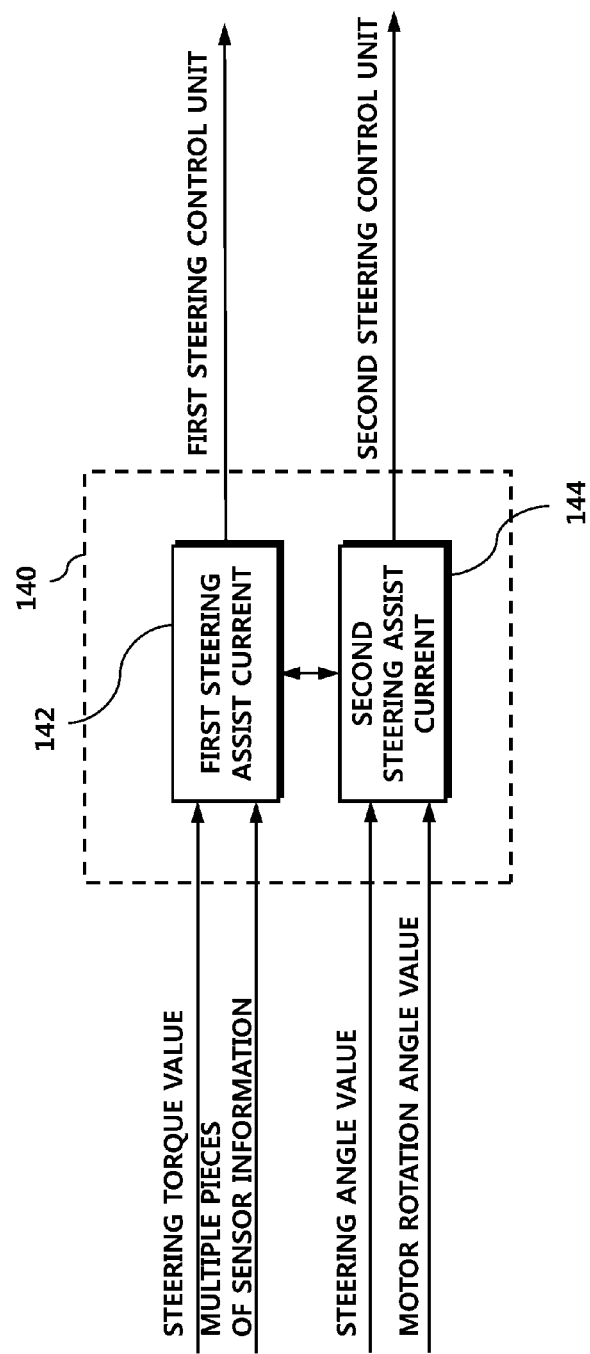
FIG. 2 is a block diagram briefly illustrating a configuration of an electronic control unit included in the electric power steering system according to the embodiment of the present invention.

The electronic control unit 140 as described above may include, as illustrated in FIG. 2, a first steering control unit 142 configured to generate the first steering assist current using the steering torque value and multiple pieces of sensor information when the torque sensor 110 fails, and a second steering control unit 144 configured to estimate the target angular velocity of the electric motor 150 using the steering angle value and the motor rotation angle value when the torque sensor 110 fails, and to generate a second steering assist current so as to cause the current motor angular velocity of the electric motor 150 to converge to the motor angular velocity.

When the torque sensor 110 is normal, the electric motor 150 generates a steering assist force by receiving the first steering assist current supplied from the electronic control unit 140, and when the torque sensor 110 fails, the electronic motor 150 generates a second steering assist force by receiving the second steering assist current supplied from the electronic control unit 140. The second steering assist current may be determined to correspond to the target motor angular velocity. As an example, the second steering assist current may be determined by a current value required for driving the electric motor 150 to the target motor angular velocity.

In this way, in the present invention, when the torque sensor 110 fails, the steering assist force is provided through the control of the motor angular velocity of the electric motor 150 without switching the electric power steering system 100 to the manual mode unlike the prior art. Therefore, it is possible to prevent the steering assist force from being momentarily lost when the torque sensor 110 fails.

Figure 3:
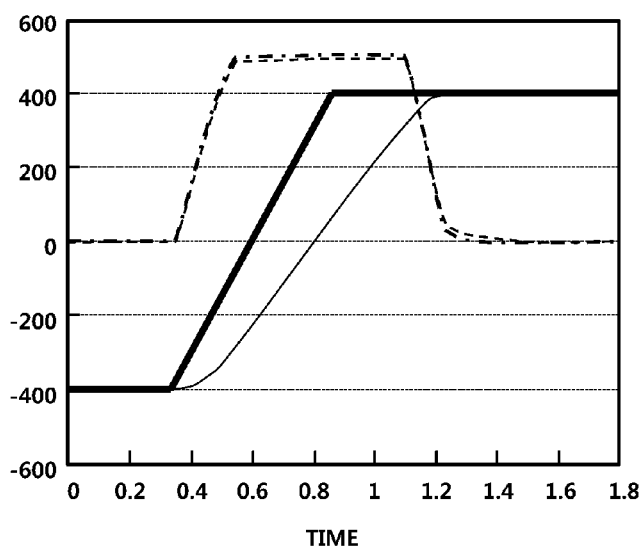
FIG. 3 is a view for describing an effect of a fail-safe control executed by the electronic control unit when the torque sensor fails in the electric power steering system according to the embodiment of the present invention.

In addition, in the present invention, when the torque sensor 10 fails, a fail-safe is processed through the control of the motor angular velocity of the electric motor 150, i.e. using a motor angular velocity which is a differential value of the motor rotation angle. Therefore, the motor rotation angle can be controlled such that no overshoot occurs for the target motor rotation angle as illustrated in FIG. 3, which can prevent occurrence of self-steering which is caused by the overshoot of the motor rotation angle.

Hereinafter, descriptions will be made on a fail-safe processing procedure executed by the electronic control unit 140 according to an embodiment of the present invention when the torque sensor fails.

Figure 4:
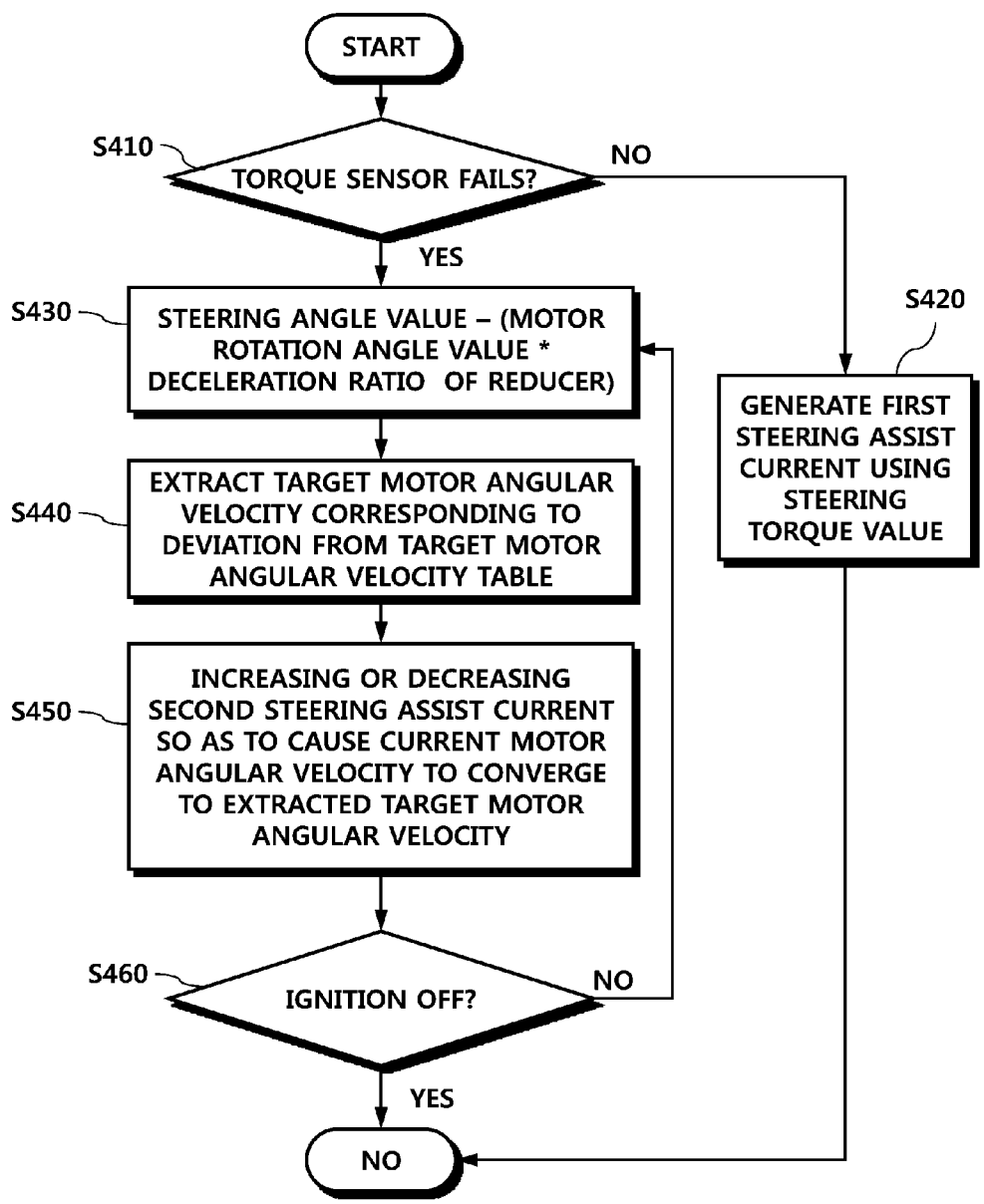
FIG. 4 is a flowchart illustrating a fail-safe processing process executed by the electronic control unit when the torque sensor in the electric power steering system according to the present invention.

FIG. 4 is a flowchart illustrating a fail-safe processing process executed by the electronic control unit when the torque sensor in the electric power steering system according to the present invention.

The electronic control unit 140 continuously monitors whether the torque sensor 110 fails, and when the torque sensor 110 is normal, the electronic control unit 140 generates a first steering assist current using the steering torque value detected by the torque sensor 110 (S410, S420).

In step S410 when it is determined that the torque sensor 110 fails, the electronic control unit calculates an estimated steering angle value by multiplying a deceleration ratio of the reducer mechanically connected to the motor shaft of the electric motor 150 by a motor rotation angle value as expressed by Equation 1, and then calculates an angular deviation by subtracting the estimated steering angle value from a steering angle value received from the steering angle sensor 120 (S430).

Thereafter, the electronic control unit 140 estimates the target motor angular velocity in a manner of extracting the target motor angular velocity corresponding to the angular deviation from the previously stored target motor angular velocity table (S440). Here, the electronic control unit 140 may calculate the angular deviation using a steering angle value detected at a time point closest to the time point when calculating the angular deviation among one or more steering angle values detected at the first sampling interval and a motor rotation angle value detected at a time point closest to the time point when calculating the angular deviation among one or more motor rotation angle values detected at the second sampling interval.

The electronic control unit 140 may calculate the current motor angular velocity of the electric motor 150 using the motor rotation angle value, and may generate a second steering assist current so as to cause the calculated current motor angular velocity to converge to the target angular velocity extracted from the target motor angular velocity table. That is, a control is performed to increase or decrease the second steering assist current by a difference between the current motor angular velocity and the motor angular velocity (S450). Here, the electronic control unit 140 may control occurrence of a failure alarm signal for the failure of the torque sensor 110.

Meanwhile, the electronic control unit 140 performs the above-described fail-safe processing until the ignition switch of the vehicle is switched from the ON state to the OFF state, and when the ignition switch is switched to the OFF state, the electronic control unit 140 terminates the fail-safe processing (S460).

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. An electric power steering system comprising:
   a torque sensor configured to detect a steering torque value of a steering wheel;
   a steering angle sensor configured to detect a steering angle value of the steering wheel;
   a motor position sensor configured to detect a motor rotation angle value which is a rotated angle of a driving shaft of an electric motor; and
   an electronic control unit configured, when the torque sensor is normal, to generate a first steering assist current for controlling a driving force of the electric motor using the steering torque value, and when the torque sensor fails, to estimate a target motor angular velocity of the electric motor using the steering angle value and the motor rotation angle value and to generate a second steering assist current so as to cause a current motor angular velocity of the electric motor to converge to the target motor angular velocity.

2. The electric power steering system of claim 1, wherein, when the torque sensor fails in a state where an ignition switch of a vehicle is turned ON, the electronic control unit generates the second steering assist current.

3. The electric power steering system of claim 1, wherein the electronic control unit calculates an estimated steering angle value by multiplying the motor rotation angle value by a deceleration ratio of a reducer mechanically connected to the driving shaft, then calculating an angular deviation by subtracting the estimated steering angle value from the steering angle value, and estimating the target motor angular velocity by extracting the target motor angular velocity corresponding to the angular deviation from a previously stored target motor angular velocity table.

4. The electric power steering system of claim 3, wherein the target motor angular velocity table includes one or more motor angular velocities that correspond to one or more angular deviations, respectively.

5. The electric power steering system of claim 3, wherein the steering angle sensor detects the steering angle value at a first pre-set sampling interval, and the motor position sensor detects the motor rotation angle value at a second pre-set sampling interval.

6. The electric power steering system of claim 5, wherein the electronic control unit calculates the angular deviation using a steering angle value detected at a time point closest to a time point when calculating the angular deviation among one or more steering angle values detected at the first sampling interval, and a motor rotation angle value detected at a time point closest to a time point when calculating the angular deviation among one or more motor rotation angle values detected at the second sampling interval.

7. The electric power steering system of claim 5, wherein the first sampling interval and the second sample interval are set to be the same.

8. The electric power steering system of claim 1, wherein the electronic control unit controls occurrence of a failure alarm signal for a failure of the torque sensor.

9. A method for processing a fail-safe of an electronic control unit in an electric power steering system, the method comprising:
a basic control performing step of generating a first steering assist current using a steering torque value detected by a torque sensor;
a sensor failure detecting step of detecting a failure of the torque sensor while the basic control is performed;
a target motor angular velocity estimating step of estimating a target motor angular velocity of the electric motor using a steering angle value of a steering wheel and a motor rotation angle value of an electric motor; and
a fail-safe control step of calculating a current motor angular velocity of the electric motor, and generating a second steering assist current so as to cause the current motor angular velocity to converge to the target motor angular velocity.

10. The method of claim 9, wherein the target motor angular velocity estimating step comprises:
an estimated steering angle calculating step of calculating an estimated steering angle value by multiplying a deceleration ratio of a reducer mechanically connected to a driving shaft of the electric motor by the motor rotation angle value;
an angular deviation calculating step of calculating an angular deviation by subtracting the estimated steering angle value from the steering angle value; and
a target motor angular velocity extracting step of extracting the target motor angular velocity corresponding to the angular deviation from a target angular velocity table that includes a plurality of target motor angular velocities corresponding to a plurality of angular velocities, respectively.

11. The method of claim 9, wherein, in the fail-safe control step, the electric power steering system controls occurrence of a failure alarm signal for the failure of the torque sensor.

* * * * *